United States Patent
Dryfoos et al.

(10) Patent No.: US 6,598,180 B1
(45) Date of Patent: Jul. 22, 2003

(54) METHOD, SYSTEM AND PROGRAM PRODUCTS FOR SELECTIVELY DEBUGGING PROGRAM VERSIONS EXECUTING WITH IN A COMPUTING ENVIRONMENT

(75) Inventors: Robert O. Dryfoos, Poughkeepsie, NY (US); Richard J. Matela, Jr., Pawling, NY (US); Richard E. Reynolds, New Fairfield, CT (US); James S. Tison, New Milford, CT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/475,887

(22) Filed: Dec. 30, 1999

(51) Int. Cl.⁷ .............................................. G06F 15/04
(52) U.S. Cl. ........................ 714/38; 717/124; 717/126; 717/128
(58) Field of Search ........................... 714/38; 717/124, 717/126, 128

(56) References Cited

U.S. PATENT DOCUMENTS

| | | | | |
|---|---|---|---|---|
| 5,687,375 A | | 11/1997 | Schwiegelshohn .......... 395/704 |
| 5,892,941 A | | 4/1999 | Khan et al. ................. 395/500 |
| 6,065,078 A | * | 5/2000 | Falik et al. ................. 717/124 |
| 6,113,645 A | * | 9/2000 | Benitz et al. ................. 714/38 |
| 6,158,045 A | * | 12/2000 | You ............................ 717/124 |
| 6,167,358 A | * | 12/2000 | Othmer et al. .............. 702/183 |
| 6,275,956 B1 | * | 8/2001 | On et al. ...................... 714/38 |
| 6,282,701 B1 | * | 8/2001 | Wygodny et al. ........... 717/124 |
| 6,351,766 B1 | * | 2/2002 | Vidovic ....................... 702/183 |
| 6,353,923 B1 | * | 3/2002 | Bogle et al. ................ 702/183 |
| 6,378,124 B1 | * | 4/2002 | Bates et al. ................. 714/707 |

OTHER PUBLICATIONS

Lauterbach GmbH , "Trace32 RTOS Debugger," http://www.lauterbach.com/rtos.html, 1999, pp. 1–5.

Abramson et al., (Intensional Programming I. ISLIP, pp 45–55, 1996) Abstract Only.

"Debugging Your Program", IBM VisualAge for C++ for Windows User's Guide, Copyright IBM Corp. 1992, 1996, pp. 263–264.

"Frequently Used Features of the Debugger", IBM VisualAge for C++ Windows User's Guide, Copyright IBM Corp. 1992, 1996, pp. 271–272.

* cited by examiner

*Primary Examiner*—Scott Baderman
*Assistant Examiner*—Anne Damiano
(74) *Attorney, Agent, or Firm*—Lily Neff, Esq.; Andrew J. Wojnicki, Esq.; Heslin Rothenberg Farley & Mesiti P.C.

(57) ABSTRACT

A program having a plurality of concurrently executing versions is debugged. A version of the program to be debugged is selected from the plurality of versions of the program, and that selected version is debugged. As one example, the selection is responsive to the receipt of at least one task of the computing environment that is associated with the version to be debugged. The debugging of the selected version does not affect other versions of the program, other programs executing within the computing environment or other tasks using that version.

43 Claims, 4 Drawing Sheets

METHOD, SYSTEM AND PROGRAM PRODUCTS FOR SELECTIVELY DEBUGGING PROGRAM VERSIONS EXECUTING WITH IN A COMPUTING ENVIRONMENT

CROSS-REFERENCE TO RELATER APPLICATIONS

This application contains subject matter which is related to the subject matter of the following applications, each of which is assigned to the same assignee as this application and filed on the same day as this application. Each of the below listed applications is hereby incorporated herein by reference in its entirety:

"Method, System And Program Products For Tracing Program Units Using A Mix Of Hook-Based Debugging And Hookless Debugging," Foley et al., Ser. No. 09/475,885; and "Facility For Evaluating a Program For Debugging Upon Detection Of A Debug Trigger Point," Dryfoos et al., Ser. No. 09/475,886.

TECHNICAL FIELD

This invention relates, in general, to the tracing and debugging of programs and, in particular, to the selective debugging of versions of programs concurrently executing within a computing environment.

BACKGROUND ART

Typically, production environments are expected to be highly-available or even continuously available. Thus, programs executing within the production environment are expected to have very few errors, if any. In order to reduce the number of errors of a new or modified program executing within the production environment, it is desirable to trace the program, as it executes within that environment. This allows the developer to see how the particular program handles in the production environment.

Although various techniques have been previously used to trace programs in the production environment, further enhancements are needed. For example, a need exists for a capability that allows selective debugging of programs within a production environment. In particular, a need exists for a capability that allows a version of a program to be debugged, while other versions of the program are still executing. A further need exists for a capability that allows one or more versions of programs to be debugged, without affecting other versions of the program or other programs of the production environment.

A yet further need exists for a capability that allows a program version to be selected for debugging based on one or more tasks associated with the version. Still further, a need exists for a capability that enables a version to be debugged for a particular task, without affecting other tasks using that version, other versions of the program or other programs.

SUMMARY OF THE INVENTION

The shortcomings of the prior art are overcome and additional advantages are provided through the provision of a method of selectively debugging a program of a computing environment. The method includes, for instance, selecting from a plurality of versions of a program a version of the program to be debugged, wherein at least two versions of the plurality of versions are executing concurrently within the computing environment; and debugging the version of the program.

In one embodiment, the debugging of the selected version does not affect use of other versions of the program.

In yet another example, the selecting is responsive to the receipt of at least one task of the computing environment. The at least one task is associated with the version to be debugged. Further, the debugging of the version associated with the at least one task does not affect one or more other tasks using the version being debugged.

System and computer program products corresponding to the above-summarized methods are also described and claimed herein.

Advantageously, one aspect of the present invention allows a debug session to operate against a single invocation of an application program or version of the application program without affecting other tasks or other debug sessions. This allows many application developers to test their changes simultaneously. Further, in one aspect of the present invention, a new version of the application program is allowed to be loaded and tested on a production system without affecting the current application program or tasks running through it. Yet further, one aspect of the present invention advantageously allows multiple program debug sessions to be active against concurrently loaded versions of an application program.

Additional features and advantages are realized through the techniques of the present invention. Other embodiments and aspects of the invention are described in detail herein and are considered a part of the claimed invention.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

BEST MODE FOR CARRYING OUT THE INVENTION

In accordance with one aspect of the present invention, one or more versions of at least one program are selected to be debugged, while one or more other versions of the at least one program or one or more other programs remain unaffected by the debugging. That is, the debugging of a version of a program is transparent to other versions of the program or to other programs. Further, the debugging of a version of a program, which is responsive to the receipt of a particular task, is transparent to other tasks using that version of the program, to other tasks using other versions of the program, and/or to other tasks using other programs.

Figure 1:
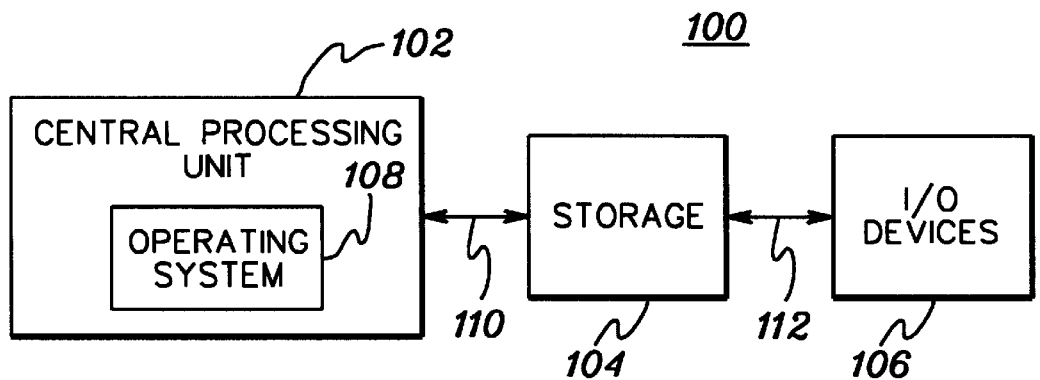
FIG. 1 depicts one example of a computing environment incorporating and using the capabilities of the present invention.

One embodiment of a computing environment incorporating and using the capabilities of the present invention is described with reference to FIG. 1. A computing environment 100 is based, for instance, on the Enterprise Systems Architecture (ESA)/390 offered by International Business Machines Corporation, Armonk, N.Y. ESA/390 is described in an IBM Publication entitled "Enterprise Systems Architecture/390 Principles of Operation," IBM Publication No. SA22-7201-05, September 1998, which is hereby incorporated herein by reference in its entirety.

Computing environment 100 includes, for instance, one or more central processing units (CPUs) 102, storage 104 and one or more input/output devices 106. Each of these components is described in detail below.

Central processing unit 102 contains the sequencing and processing facilities for instruction execution, interruption action, timing functions, initial program loading and other machine related functions. In one embodiment, central processing unit 102 executes an operating system 108, such as, for instance, the Transaction Processing Facility (TPF) offered by International Business Machines Corporation. TPF controls the execution of transactions and/or programs running within the system and the processing of data. Further, TPF is also used with one or more of the tracing or debugging capabilities of the present invention. One example of TPF is described in detail in "TPF V4R1 Concepts and Structures," IBM Publication No. GH31-0139-06, Mar. 23, 1999, which is hereby incorporated herein by reference in its entirety.

Central processing unit 102 is coupled via, for example, a bidirectional bus 110, to storage 104. Storage 104 is, for instance, directly addressable and provides for high-speed processing of data by the central processing unit(s). Storage 104 can be physically integrated with the CPU(s) or constructed as stand-alone units.

Storage 104 is further coupled via, for instance, a bidirectional bus 112, to input/output devices 106. Input/output devices 106 may include, for instance, printers, magnetic tape units, direct access storage devices (DASD), displays, keyboards, communication controllers, teleprocessing devices and optical and sensor-based equipment. Data is transferred from storage 104 to I/O devices 106 and from the I/O devices back to storage via known input/output commands.

The above-described computing environment is only one example. The capabilities of the present invention can be used with many other computing environments without departing from the spirit of the present invention. For example, the capabilities of the present invention can be used with Windows NT, AIX or other systems.

Figure 2:
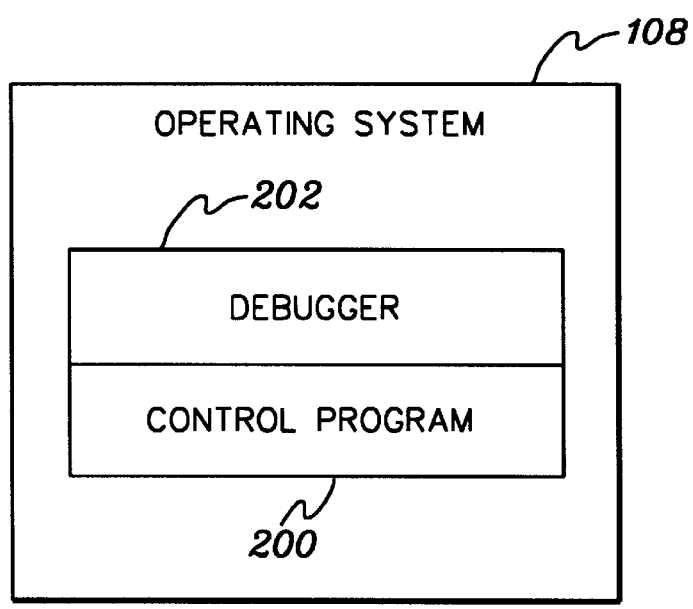
FIG. 2 depicts one example of various components associated with an operating system of FIG. 1 used with the present invention.

Further details of operating system 108 are described with reference to FIG. 2. In one example, operating system 108 includes a control program 200, which performs many of the control functions associated with an operating system. Coupled to control program 200 is at least one debugger 202. A debugger can be implemented in software, hardware, microcode or any combination thereof. In one embodiment, debugger 202 is sold as a package with the TPF operating system of International Business Machines Corporation. Debugger 202 includes logic associated with the selective debugging feature of the present invention.

Although the debugger is shown as part of the operating system, this is not necessary. A portion or all of the debugger may be separate from the operating system.

Operating system 108 may also include various other programs/tools that need not be described for the various aspects of the present invention.

Figure 3:
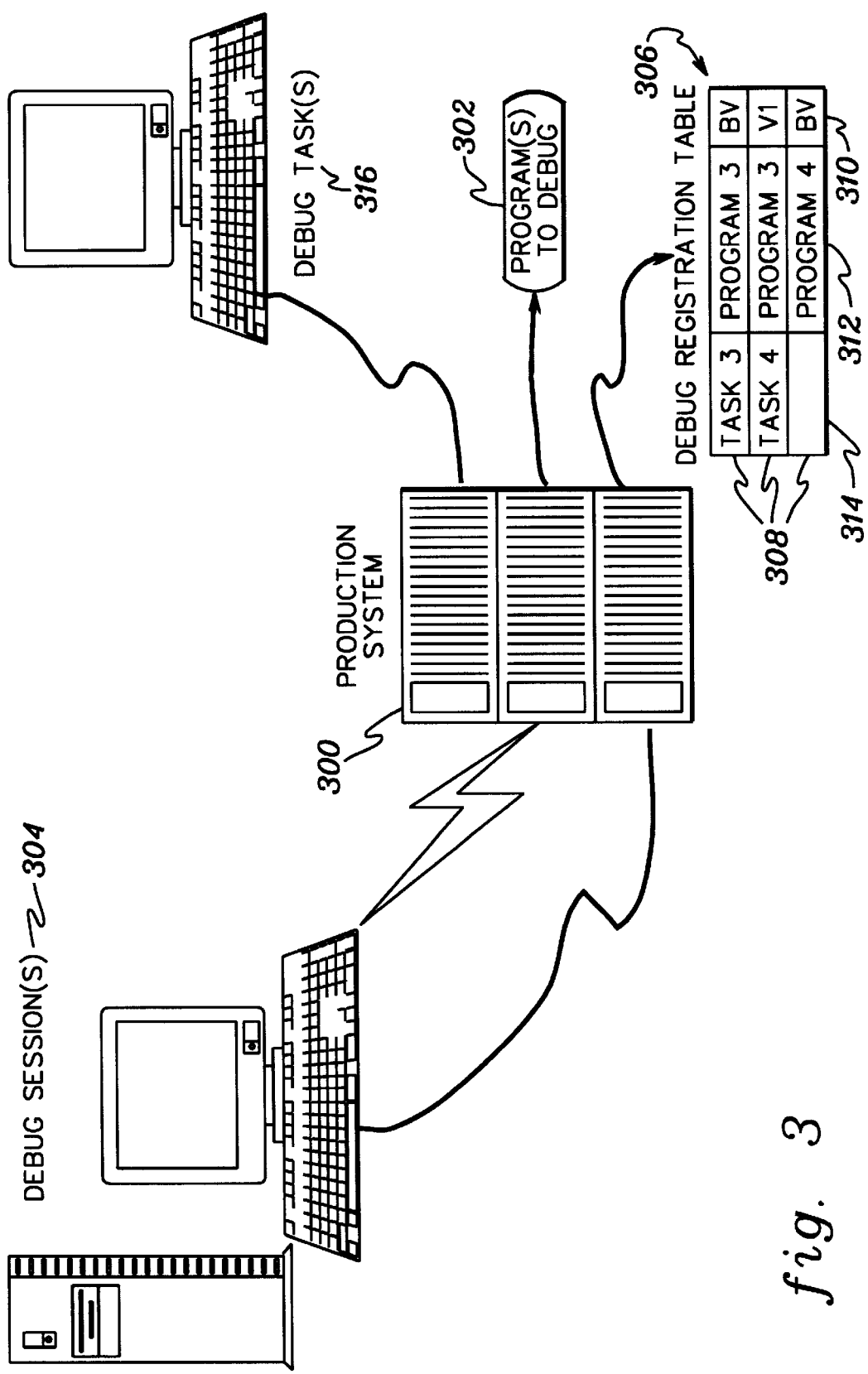
FIG. 3 depicts further details of a computing environment incorporating and using the capabilities of the present invention.

In one example, computing environment 100 may be a production environment 300 (FIG. 3) that is highly-available or even continuously available. The production environment is capable of executing a plurality of programs, at least some of which are executing concurrently. As used herein, concurrently refers to at least some portion of one program running simultaneously with at least some portion of another program. Further, in one example, one or more of the programs executing within the production environment may have a plurality of versions associated therewith. For example, Program 3 may have a base version (BV) and a first version (V1) associated therewith. One or more of the versions may be running concurrently. The concurrent execution of multiple versions of a program is described in detail in commonly assigned, U.S. patent application Ser. No. 08/522,767, entitled "Method And System For Loading Shared Executable Modules In A Computer System", filed on Sep. 1, 1995, which is hereby incorporated herein by reference in its entirety.

One or more of the programs to be executed within the production environment can be debugged 302. The specific program(s) to be debugged, and in particular, the version(s) of the program(s) to be debugged is selected using an aspect of the present invention, as described below.

One or more developers that wish to trace or debug one or more programs of the production environment set up at least one debug session 304 to identify the program(s) and version(s) of the program(s) to be debugged. A debug session may also identify the task that is used to trigger the debug of a particular program version. For example, a debug session may be set up for the base version of Program 3, when that version of Program 3 is executed in response to Task 3. This information is stored in a debug registration table 306.

In one example, debug registration table 306 includes one or more entries 308. Each entry includes, for instance, a program version identifier field 310 indicating the version of the program to be debugged; a program identifier field 312 specifying the program to be debugged; and a task identifier field 314 identifying the task that will trigger the debug of the program version specified in fields 310 and 312. In another embodiment, a task identifier need not be provided, and thus, each time the specified program version is executed, it is debugged. For example, in debug registration table 306, the base version of Program 4 is debugged each time that it is executed, regardless of which task initiates the execution of that version of the program, since task identifier field 314 is empty. This is in contrast to Program 3, Version 1 that is debugged only when Task 4 employs that version of the program.

The tasks (e.g., debug tasks 316) are received within production environment 300 from one or more terminals that are a part of or coupled to the production environment. A task includes, for instance, a message specifying a particular request. For example, a task may be a message requesting a reservation on an airline.

Figure 4:
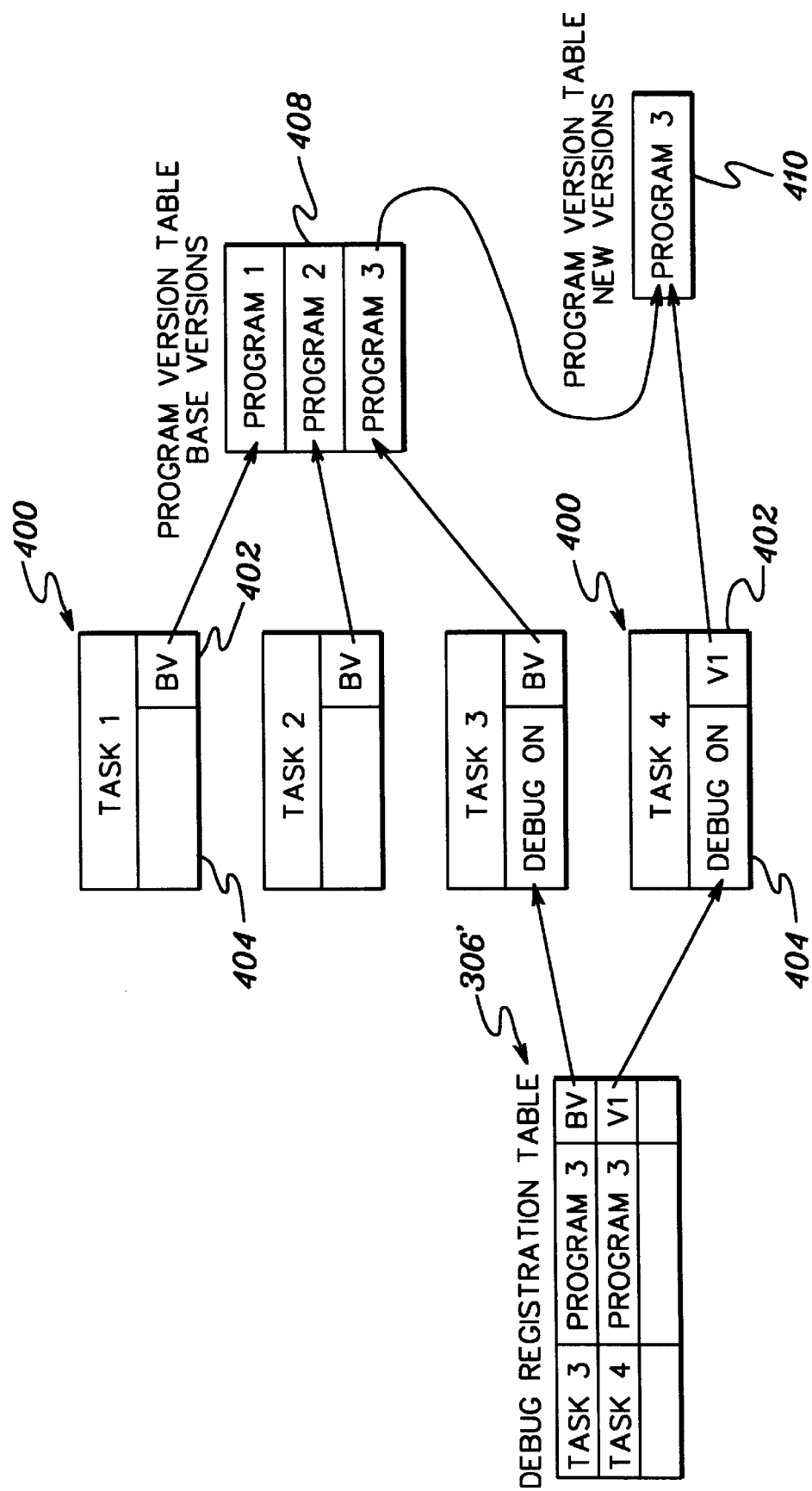
FIG. 4 illustrates the use of a debug registration table to identify the particular program versions to be debugged, in accordance with one aspect of the present invention.

Further details regarding the relationship between tasks, programs, versions and the debug registration table are described with reference to FIG. 4. As shown in FIG. 4, in this example, there are four tasks (e.g., Tasks 1–4) executing within the production environment. Each task has a control block 400 associated therewith. The control block maintains information associated with the task. In one example, the control block includes a version field 402 specifying the version of the program to be employed by the task, and a debug indicator field 404 specifying whether a request to debug is indicated (a blank field indicates debug is not requested).

In the particular scenario depicted in FIG. 4, Task 1 is executing a base version (BV) of Program 1, Task 2 is executing a base version of Program 2 and Task 3 is executing a base version of Program 3. Pointers to each of those programs are stored within a Program Version Table for Base Versions 408. Further, as shown, Task 4 is executing version 1 of Program 3, and a pointer of that program version is stored in a Program Version Table For New Versions 410. There is a coupling between Program Version Table For Base Versions 408 and Program Version Table For New Versions 410 for any programs that have both a base version and a new version. The production environment maintains this library of multiple program versions, including base versions and any new versions, through the use of table structures. Using a table structure allows the loading and activating of new program versions without affecting the current program base and tasks, which may be actively using that base, as described in the aforementioned U.S. patent application Ser. No. 08/522,767, entitled "Method And System For Loading Shared Executable Modules In A Computer System".

A debug registration table 306' indicates which tasks are debug candidates. Further, it indicates the program and the version of the program associated with that task to be debugged. For example, debug registration table 306' indicates that Task 3 is a debug candidate, and thus, the receipt of Task 3 within the production environment indicates that the base version of Program 3 is to be debugged. Thus, debug indicator 404 is turned on in the control block relating to Task 3, base version. Similarly, debug registration table 306' indicates that a debug indicator is to be turned on for Task 4, Version 1 of Program 3. Additional details relating to the debug registration table are described in the following commonly assigned U.S. patent applications Ser. No. 09/129,555, entitled "Debugging Client Server Programs From Third Party Workstations", filed Aug. 5, 1998; Ser. No. 09/129,824, entitled "Debugging Client Server Programs From Third Party Workstations", filed Aug. 5, 1998; and Ser. No. 09/129,345, entitled "Debugging Client Server Programs From Third Party Workstations", filed Aug. 5, 1998, each of which is hereby incorporated herein by reference in its entirety.

Figure 5:
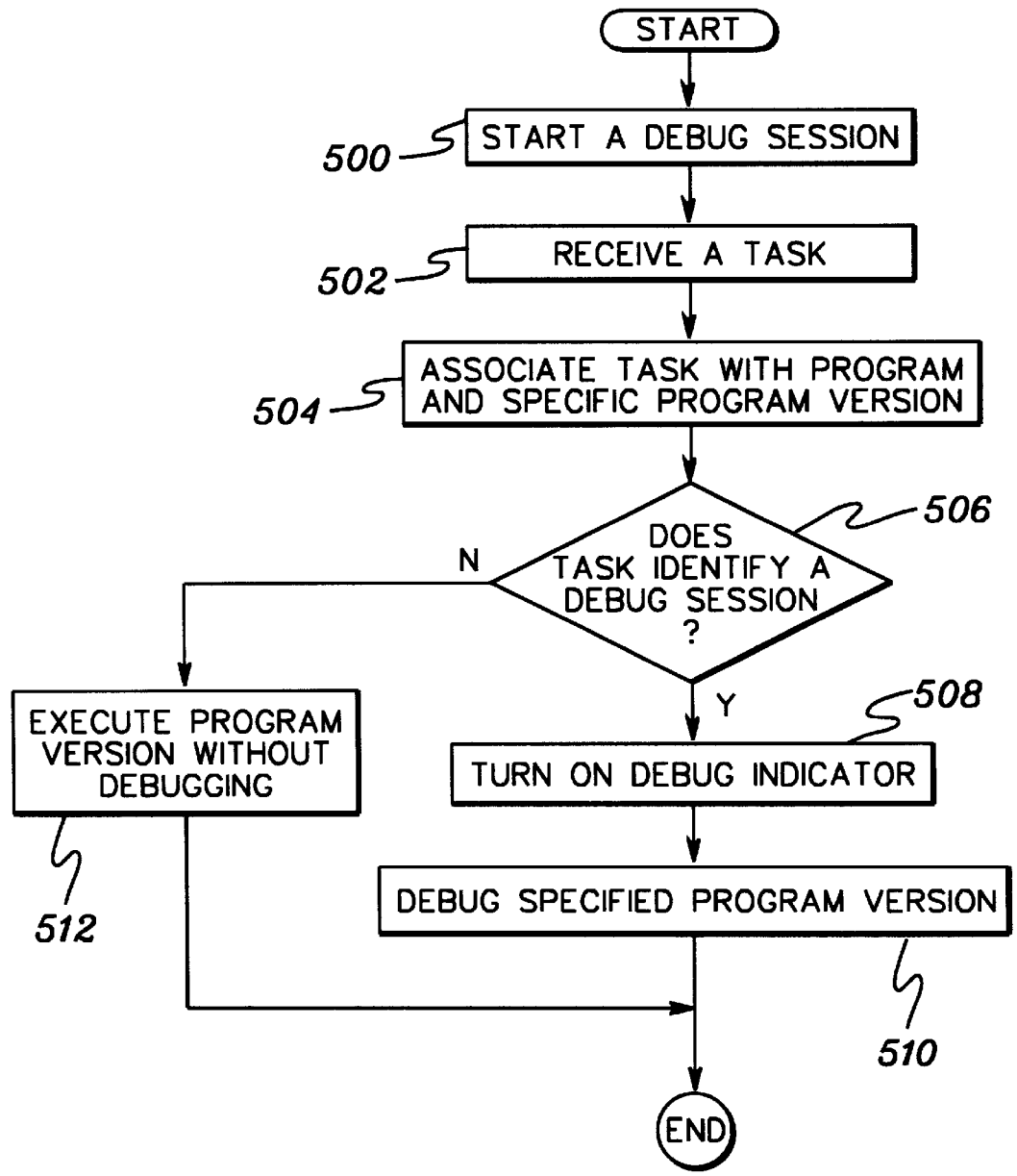
FIG. 5 depicts one embodiment of the logic associated with identifying program versions to be debugged, in accordance with one aspect of the present invention.

One embodiment of the logic associated with selecting a version of a program to be debugged is described with reference to FIG. 5. Initially, a debug session is commenced by an application developer typically working at a workstation at or coupled to the production environment, STEP 500. In order to start the debug session, the developer stores information pertaining to the debug session in debug registration table 306. This information includes, for instance, an identification of the task that is to employ the program to be debugged; an identification of the program to be debugged; and an identification of the version of the program to be debugged. In other examples, the task field may be left blank and thus, the specified version of the program to be debugged is debugged when the program is executed, regardless of which task is initiating the execution thereof. Further, in other embodiments, the version field can be left blank such that the next invocation of any version of the program is debugged.

At some point, a task will be received from a terminal at or coupled to the production environment, STEP 502. When the task is received, logic within the production environment associates the task with a program, and in particular, to a specific program version to be executed, STEP 504. (Details regarding this association are described in the aforementioned U.S. patent application Ser. No. 08/522,767, entitled "Method And System For Loading Shared Executable Modules In A Computer System".)

Thereafter, a determination is made as to whether the task identifies a debug session, INQUIRY 506. In one example, this determination is made by logic within the production environment, which checks the debug registration table. If the task is listed in the debug registration table for the particular version of the program that is being executed, then the task does identify a debug session. Thus, the debug indicator for that task is turned on by the production environment logic, as described above, STEP 508.

Subsequent to turning on the debug indicator, the specified program version is executed. At this time, the debugger determines that the indicator is on, and therefore, initiates the debugging of the specified program version that is associated with that task, STEP 510. In one example, the program version is debugged using debugger 202.

Returning to INQUIRY 506, if, however, the task does not identify a debug session, then the program version identified by the task is run, but is not traced or debugged, STEP 512.

Described above is one example in which versions of programs can be selectively debugged. The debugging of a particular program version does not affect other versions of the program or other programs. For example, if Program 3 is to be debugged, and Program 3 is called by another program, the other program (or any others coupled thereto) is not affected by the debugging of Program 3. Only Program 3 is debugged. Further, when a task is used to activate the debugging of a specified program version, only that task is affected. Other active tasks are not affected (i.e., they process as normal), even those tasks which may be sharing the programs being debugged.

The embodiment described above is only one example. Various additions, deletions and/or modifications can be made without departing from the spirit of the present invention. For example, other debuggers may be used. One debugger for personal computers is described in "Visual Age for C++ For Windows** Users' Guide Version 3.5," IBM Publication No. S33H-5031, February 1996, which is hereby incorporated herein by reference in its entirety.

The present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A method of selectively debugging a program of a single computing system, said method comprising:
   selecting from a plurality of versions of a program a version of said program to be debugged, wherein at least two versions of said plurality of versions are executing concurrently within said single computing system; and
   debugging said version of said program.

2. The method of claim 1, wherein said debugging of said version does not affect use of other versions of said plurality of versions of said program.

3. The method of claim 1, wherein said selecting is responsive to receipt of at least one task of said computing system, said at least one task being associated with said version to be debugged.

4. The method of claim 3, wherein said debugging of said version associated with said at least one task does not affect one or more other tasks using said version being debugged.

5. The method of claim 3, wherein said debugging of said version associated with said at least one task does not affect one or more tasks using one or more other versions of said program or one or more other programs of said single computing system.

6. The method of claim 1, wherein said selecting comprises:
   determining whether a task to be executed within said computing system is associated with a debug session identifying said version of said program to be debugged; and
   selecting said version to be debugged, when said determining indicates said task is associated with said debug session.

7. The method of claim 6, wherein said determining comprises using a table having one or more debug sessions therein to determine whether said task is associated with said debug session.

8. The method of claim 6, wherein said debug session comprises at least one of an identifier of said task, an identifier of said program and an identifier of said version.

9. The method of claim 1, wherein said selecting comprises selecting from a plurality of versions of one or more programs multiple versions to be concurrently debugged within the single computing system, and wherein said debugging comprises debugging said multiple versions.

10. The method of claim 9, wherein said selecting is responsive to receipt of one or more tasks of said computing system, said one or more tasks being associated with said multiple versions to be debugged.

11. The method of claim 1, wherein said at least two versions of said plurality of versions are executing concurrently within a production environment, and wherein said debugging is being performed within said production environment.

12. The method of claim 1, wherein said debugging of said version of said program does not affect one or more other programs that may be coupled to said program.

13. The method of claim 1, wherein said selecting comprises referencing a table to determine which version of said plurality of versions is to be debugged.

14. The method of claim 13, wherein said referencing employs a task identifier to determine which version is to be debugged.

15. A system of selectively debugging a program of a single computing system, said system comprising:
   means for selecting from a plurality of versions of a program a version of said program to be debugged, wherein at least two versions of said plurality of versions are executing concurrently within said single computing system; and
   means for debugging said version of said program.

16. The system of claim 15, wherein the debugging of said version does not affect use of other versions of said plurality of versions of said program.

17. The system of claim 15, wherein the means for selecting is responsive to receipt of at least one task of said computing system, said at least one task being associated with said version to be debugged.

18. The system of claim 17, wherein the debugging of said version associated with said at least one task does not affect one or more other tasks using said version being debugged.

19. The system of claim 17, wherein the debugging of said version associated with said at least one task does not affect one or more tasks using one or more other versions of said program or one or more other programs of said single computing system.

20. The system of claim 15, wherein said means for selecting comprises:
   means for determining whether a task to be executed within said computing system is associated with a debug session identifying said version of said program to be debugged; and
   means for selecting said version to be debugged, when said means for determining indicates said task is associated with said debug session.

21. The system of claim 20, wherein said means for determining comprises a table having one or more debug sessions therein usable in determining whether said task is associated with said debug session.

22. The system of claim 20, wherein said debug session comprises at least one of an identifier of said task, an identifier of said program and an identifier of said version.

23. The system of claim 15, wherein said means for selecting comprises means for selecting from a plurality of versions of one or more programs multiple versions to be concurrently debugged within the single computing system, and wherein said means for debugging comprises means for debugging said multiple versions.

24. The system of claim 23, wherein said means for selecting is responsive to receipt of one or more tasks of said computing system, said one or more tasks being associated with said multiple versions to be debugged.

25. The system of claim 15, wherein said at least two versions of said plurality of versions are executing concurrently within a production environment, and wherein the debugging is being performed within said production environment.

26. The system of claim 15, wherein the debugging of said version of said program does not affect one or more other programs that may be coupled to said program.

27. The system of claim 15, wherein said means for selecting comprises means for referencing a table to determine which version of said plurality of versions is to be debugged.

28. The system of claim 27, wherein said means for referencing employs a task identifier to determine which version is to be debugged.

29. A system of selectively debugging a program of a single computing system, said system comprising:
   a processor adapted to select from a plurality of versions of a program a version of said program to be debugged, wherein at least two versions of said plurality of versions are executing concurrently within said single computing system; and
   a debugger adapted to debug said version of said program.

30. At least one program storage device readable by a machine, tangibly embodying at least one program of instructions executable by the machine to perform a method of selectively debugging a program of a single computing system, said method comprising:

selecting from a plurality of versions of a program a version of said program to be debugged, wherein at least two versions of said plurality of versions are executing concurrently within said single computing system environment; and debugging said version of said program.

31. The at least one program storage device of claim 30, wherein said debugging of said version does not affect use of other versions of said plurality of versions of said program.

32. The at least one program storage device of claim 30, wherein said selecting is responsive to receipt of at least one task of said computing system, said at least one task being associated with said version to be debugged.

33. The at least one program storage device of claim 32, wherein said debugging of said version associated with said at least one task does not affect one or more other tasks using said version being debugged.

34. The at least one program storage device of claim 32, wherein said debugging of said version associated with said at least one task does not affect one or more tasks using one or more other versions of said program or one or more other programs of said single computing system.

35. The at least one program storage device of claim 30, wherein said selecting comprises:

determining whether a task to be executed within said computing system is associated with a debug session identifying said version of said program to be debugged; and selecting said version to be debugged, when said determining indicates said task is associated with said debug session.

36. The at least one program storage device of claim 35, wherein said determining comprises using a table having one or more debug sessions therein to determine whether said task is associated with said debug session.

37. The at least one program storage device of claim 35, wherein said debug session comprises at least one of an identifier of said task, an identifier of said program and an identifier of said version.

38. The at least one program storage device of claim 30, wherein said selecting comprises selecting from a plurality of versions of one or more programs multiple versions to be concurrently debugged within the single computing system, and wherein said debugging comprises debugging said multiple versions.

39. The at least one program storage device of claim 38, wherein said selecting is responsive to receipt of one or more tasks of said computing system, said one or more tasks being associated with said multiple versions to be debugged.

40. The at least one program storage device of claim 30, wherein said at least two versions of said plurality of versions are executing concurrently within a production environment, and wherein said debugging is being performed within said production environment.

41. The at least one program storage device of claim 30, wherein said debugging of said version of said program does not affect one or more other programs that may be coupled to said program.

42. The at least one program storage device of claim 30, wherein said selecting comprises referencing a table to determine which version of said plurality of versions is to be debugged.

43. The at least one program storage device of claim 42, wherein said referencing employs a task identifier to determine which version is to be debugged.

* * * * *

UNITED STATES PATENT AND TRADEMARK OFFICE
CERTIFICATE OF CORRECTION

PATENT NO.    : 6,598,180 B1
DATED         : July 22, 2003
INVENTOR(S)   : Dryfoos et al.

It is certified that error appears in the above-identified patent and that said Letters Patent is hereby corrected as shown below:

<u>Title page, Item [54] and Column 1, line 4,</u>
Delete the words "WITH IN" and insert -- WITHIN --

Signed and Sealed this

Sixteenth Day of September, 2003

JAMES E. ROGAN
*Director of the United States Patent and Trademark Office*